July 19, 1960  R. J. LIPINSKI  2,945,778
TREATMENT OF ALUMINUM AND COMPOSITION THEREFOR
Filed March 7, 1957

INVENTOR:
RICHARD J. LIPINSKI
BY Howson & Howson
ATTYS.

United States Patent Office 2,945,778
Patented July 19, 1960

2,945,778

TREATMENT OF ALUMINUM AND COMPOSITION THEREFOR

Richard J. Lipinski, Erie, Pa., assignor to Lord Manufacturing Company, Erie, Pa., a corporation of Pennsylvania Filed Mar. 7, 1957, Ser. No. 644,487

9 Claims. (Cl. 148—6.24)

The present invention relates to a novel method of improving the bondability of aluminum surfaces toward organic polymeric materials and to the resulting treated product; and, more particularly, the invention relates to a novel method whereby the adhesion of polymeric organic materials to aluminum surfaces is enhanced through chemical treatment of the metal surface, and to the improved bonded assembly. The invention also relates to novel compositions for treating aluminum surfaces for improving the bondability thereof toward organic polymeric materials, and to novel products comprising the treated aluminum. The present application is a continuation-in-part of application Serial No. 563,901, filed February 7, 1956, now abandoned.

The problem of bonding organic polymeric materials to aluminum surfaces is becoming of increasing importance. The problem is presently most prevalent in two main fields: (1) the coating of aluminum surfaces with organic polymeric compositions, such as paints and other films, for protective and/or decorative purposes; and (2) the application of an organic polymeric adhesive composition to the aluminum surface in a bonding operation whereby another material, which may be organic or inorganic, is bonded to the aluminum surface through the agency of the stated adhesive.

It is generally known that the bonds obtained between organic polymeric materials and aluminum surfaces are not as great as is desired in most instances. Although the actual magnitude of bond strength depends upon the particular material bonded to the aluminum surface, with any combination means have been sought by which the adhesion may be increased. It is to the marked increase of adhesion between organic polymeric materials generally to aluminum surfaces generally by an entirely new and novel principle that the present invention is directed.

It is the principal object of the present invention to provide a method of increasing the bondability of aluminum surfaces toward organic polymeric materials.

It is another object of the present invention to provide a method of bonding organic polymeric materials to aluminum surfaces by which improved adhesion between the two stated components is obtained.

It is another object of the present invention to provide a relatively simple and economic method of treating aluminum surfaces to markedly enhance the bondability of the treated surface to applied organic polymeric materials.

A further object of the invention is to provide novel assemblies comprising aluminum surfaces bonded to organic polymeric materials in which the adhesion between the aluminum surface and the organic polymeric material is greater than in prior assemblies.

Other objects, including the provision of a novel treated aluminum surface to which organic polymeric materials can be bonded with increased adhesion, and the provision of novel compositions for treating aluminum surfaces, will become apparent from the following specification and the claims.

It has been found that the treatment of an aluminum surface with a nitrosulfonic acid solution, having a pH below about 4, substantially free of strong acid other than said nitrosulfonic acid and nitric acid, alters the aluminum involving an etching and activation of the surface by the formation of a film thereon in such a way that organic polymeric materials applied to the altered surface adhere thereto with a tenacity substantially greater than is the case with similar but untreated aluminum surfaces. The results are markedly improved over treatment with sulfonic acids containing no nitro group, and are unexpected in view of a prior suggested treatment of aluminum with a solution of a strong acid containing a nitrosulfonic acid to serve as an accelerator in dissolving the aluminum wherein no adhesion-permitting film was obtained.

The method of the present invention, therefore, comprises wetting the aluminum surface with the stated nitrosulfonic acid solution until the aluminum surface is visibly altered through formation of the stated film thereon, and recovering the aluminum with the film on the surface thereof. The resulting product comprises the altered aluminum surface having thereon a film constituting a reaction product between the aluminum and the nitrosulfonic acid. There may then be applied to the aluminum surface contacted by the nitrosulfonic acid the desired organic polymeric material. The resulting product comprises the aluminum surface and the organic polymeric material bonded to each other through the agency of a film formed on the aluminum and constituting a reaction product between the aluminum and the nitrosulfonic acid.

The present invention will be more readily understood from a consideration of the drawings in which.

Figure 1:
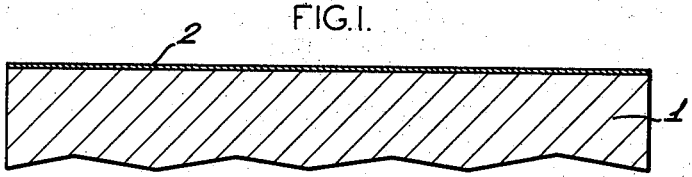
Fig. 1 is a side view in section showing a piece of aluminum having the film thereon.

As will appear hereinafter further improvements are obtained by including in the nitrosulfonic acid treating solution additives providing a synergistic action in combination with the nitrosulfonic acid, principally boric acid.

The treatment of the present invention has been found to result in vastly improved bonds between aluminum surfaces and organic polymeric materials applied thereto. This means that protective and decorative coatings comprising organic polymeric materials which are applied to such treated aluminum surfaces adhere thereto more tenaciously than the same coatings applied to similar but untreated aluminum surfaces. Likewise, adhesives comprising polymeric organic material applied to the treated aluminum surfaces bond more tenaciously to the treated surface so that other structural elements bonded to the aluminum surface through the agency of the applied adhesive are more tenaciously bonded thereto than is the case with similar assemblies produced, however, without the treatment of the invention.

The magnitude of the increase in adhesion obtained through the present invention may range from several percent to several fold, the latter in the case of aluminum-organic polymeric material systems which normally have little or no significant bonding affinity for each other. The reason for the increased adhesion obtained by the present invention is not presently fully understood. It is known, however, that the nitrosulfonic acid solution initially removes oxide on the aluminum surface and etches slightly into the surface. More important, however, is the formation of a film which can be visually observed. This film is believed to result from some retention, on the aluminum surface, of the product of the reaction between the nitrosulfonic acid and the aluminum, the aluminum replacing the hydrogen ion of the nitrosulfonic acid and the residue of the nitrosulfonic acid bonding chemically to the aluminum of the aluminum surface. The aluminum atom to which the residue of the nitrosulfonic acid is chemically bonded is itself part of the main mass of metal and is bonded thereto by means of the forces governing its initial incorporation in the surface lattice. The film is thus firmly attached chemically to the aluminum surface. The film also appears to be more readily wetted by organic materials applied thereto than is the untreated aluminum surface. At any rate, organic materials applied to the film adhere thereto, and hence to the metal body, with much greater tenacity than to the same metal untreated.

The treatment is applicable to aluminum, that is to pure or commercially pure aluminum and to alloys comprising aluminum in which aluminum is the major constituent. Examples of alloys which may be treated are: (1) cast aluminum alloys; such as 5–12% silicon, balance aluminum; 3–8% copper and .5–9% silicon, balance aluminum; 3–10% magnesium, balance aluminum; .4–10% copper and .2–2% magnesium, balance aluminum; .5–10% silicon and .3–4% magnesium, balance aluminum; 2–7% copper and 1–11% zinc, balance aluminum; 3–4% magnesium and 1–2% zinc, balance aluminum; 1% copper and 1% nickel, balance aluminum; 2% manganese, balance aluminum; 1% copper, 1% nickel and 6.5% tin, balance aluminum; and the like; (2) wrought aluminum alloys; such as 1.2% manganese, balance aluminum; 1.2% manganese and 1% magnesium, balance aluminum; 2–5% copper, .5–1% manganese and .3–2% magnesium, balance aluminum; 0.8% silicon, 4.5% copper and 0.8% manganese, balance aluminum; 12.2% silicon, 0.9% copper, 1.1% magnesium and 0.9% nickel, balance aluminum; 0.6% silicon, 0.25% copper, 1% magnesium and 0.25% chromium, balance aluminum; 0.4% silicon and 0.7% magnesium, balance aluminum; 1.6% copper, 2.5% magnesium, 0.3% chromium and 5.6% zinc, balance aluminum; and the like.

As far as the nitrosulfonic acid is concerned it has been found that any sulfonic acid containing one or more nitro ($-NO_2$) groups will provide the improved results. Nitrosulfonic acids, as this term is used herein, include any acid having the general formula $R(SO_3H)_n(NO_2)_m$ where R is any organic radical, preferably an aromatic radical like benzene or naphthalene (including substituted derivative thereof), and $n$ and $m$ are one or more.

Examples of nitrosulfonic acids which may be employed in accordance with the present invention are:

p-Nitrobenzene sulfonic acid,
m-Nitrobenzene sulfonic acid,
2-chloro-5-nitrobenzene sulfonic acid,
2,4-dinitrobenzene sulfonic acid,
o-Nitroanilino-p-sulfonic acid,
2-nitrotoluene-4-sulfonic acid,
5-nitrotoluene-2-sulfonic acid,
2-nitro-bromobenzene-4-sulfonic acid,
2,4-dinitronaphthyl-7-sulfonic acid,
6-amino-4-nitro-1-phenol-2-sulfonic acid,
5-amino-4-nitro-1-phenol-2-sulfonic acid,
3,5-dinitro-p-toluene sulfonic acid,
4,4'-dinitro-2,2'-stilbene disulfonic acid,
1-nitroanthroquinone-5-sulfonic acid.

In treating the aluminum surface with the nitrosulfonic acid in accordance with the present invention, a solution of the nitrosulfonic acid may be applied to the aluminum surface as by brushing, spraying, dipping, or the like. The nitrosulfonic acids are soluble in water, at least to the extent required for the present invention, and, hence, water represents the preferred solvent medium for use in treating the aluminum surfaces. However, other liquids may be used in place of or in conjunction with water, such as alcohols, like methanol and ethanol; glycols; glycerol; glycol ethers; and the like.

The concentration of the nitrosulfonic acid in the treating solution has been found to be relatively immaterial. In this connection, it has been found that the nitrosulfonic acid, even at very low concentrations, selectively reacts with the aluminum surface. Thus, concentrations of nitrosulfonic acid in the treating solution as low as about 1%, by weight, are satisfactory. The maximum concentration of the nitrosulfonic acid in the treating medium is limited only by the solubility of the particular nitrosulfonic acid in the particular solvent medium selected. In many cases, the concentration of nitrosulfonic acid may go up to as high as 30–40%, by weight, although no advantage is to be gained by employing concentrations substantially in excess of about 20%, by weight.

As stated, the pH of the treating medium will be below about 4. In this connection, for general purposes, the lower the pH, that is to say the higher the acidity, the more rapid is the action of the bath on the aluminum and in some cases may go as low as about 0.5. The preferred pH range is between about 1 and about 3.

Generally the nitrosulfonic acid, if used as such, will provide the desired pH. However, in the event that it does not, and especially where a salt of the nitrosulfonic acid is used, nitric acid may be added to the bath to provide the desired pH. Nitric acid, unlike other strong acids like sulfuric acid, hydrochloric acid, hydrofluoric acid, phosphoric acid, and the like, is not detrimental to the formation of the desired film by the nitrosulfonic acid. Thus, as stated above, the bath will be substantially free of strong acid other than nitric acid and, of course, the nitrosulfonic acid. Weak acids, like boric acid, may be included in the bath without detrimental effect on film formation, although no advantage is to be gained by employing a weak acid other than boric acid which will be discussed more in detail below.

A particularly advantageous synergistic agent in the bath is boric acid either added as such or as a borate in conjunction with sufficient nitric acid when necessary to provide the desired pH. The presence of this material has been found to impart a longer useful life to the nitrosulfonic acid bath, to maintain the desired pH conditions in the bath over a longer period of time and to provide an equalizing effect on the treated aluminum surface so that the degree of alteration over the treated surface is more uniform throughout. The concentration of boric acid in the bath may range up to about 10%, by weight, when sufficient nitric acid is present to provide the requisite pH, although generally no advantage is gained by employing amounts above about 5%, by weight. Examples of boric acid-supplying compounds, other than boric acid itself, that may be employed are the alkali metal borates, especially sodium borate.

It will be apparent from the foregoing that the bath compositions employed in accordance with preferred practice of the present invention may be as follows: (1) a bath consisting essentially of the nitrosulfonic acid; (2) a bath consisting essentially of the nitrosulfonic acid (either added as such or as a salt), and nitric acid; (3) a bath consisting essentially of nitrosulfonic acid and boric acid; (4) a bath consisting essentially of the nitrosulfonic acid (either added as such or as a salt), boric acid (either added as such or as a salt) and nitric acid. By "consisting essentially" is meant that the bath will not contain material quantities of other materials adversely affecting the function of the bath for the purposes herein intended. As stated previously nitric acid and weak acids like boric acid, are not detrimental to the bath, and, in fact, have a beneficial affect. Other additives, of the type mentioned below may be included in the bath.

A particularly advantageous stable article of manufacture adapted for dissolution in a solvent to form a bath is a mixture of a dry, solid, finely-divided nitrosulfonic acid, like 2,4-dinitrobenzene sulfonic acid or 5-nitro-o-toluene sulfonic acid, and dry, solid, finely-divided boric acid (or a borate) in a weight ratio between about 1 to 1 and 10 to 1.

In any of the baths or bath making compositions of the preesnt invention may be included a nonionic wetting agent to aid in wetting the aluminum surface, and a complexing agent to complex aluminum in solution and thereby stabilize the solution over a long period of use. An especially advantageous agent possessing combined wetting and complexing properties is the solid condensate of ethylene oxide with a hydrophobic base formed by condensing propylene oxide with propylene glycol. It has also been found that a small amount of a fluoride, not over 5%, by weight, based on the weight of the nitrosulfonic acid, has a beneficial effect particularly where rapid treating times are desired.

The temperature of the solution during the treatment may vary somewhat, depending upon the other conditions, principally pH, and in general, the higher the temperature the greater the rate of reaction. Thus temperature can be correlated with the other conditions, principally pH of the solution, to provide any desired rate of reaction. Broadly speaking, the temperature of the treating solution may range from room temperature up to the boiling point, although in most cases the temperature need not exceed about 180° F. Preferably, a temperature above about 100° F. is employed.

As stated, treatment of the aluminum surface with the nitrosulfonic acid in accordance with the present invention results in etching of the surface and the formation of a film. This film is discernible to the naked eye, although its thickness may be so minute as not to be readily measurable. During treatment of the aluminum surface a decided change in the appearance thereof takes place, due in large measure to the etching and formation of the film, and at the outset this change is not uniform over the surface. In time the changed appearance does become uniform, and this uniformity of appearance denotes substantial completion of the treatment. Contact of the nitro-sulfonic acid-containing solution with the aluminum surface may continue beyond this point, although no significant advantage is obtained. As the film which forms builds up over the aluminum surface it serves as a barrier layer to reduce etching to a minimum so that the aluminum can be left in contact with the solution beyond the stated point. The exact time required to complete the treatment depends, as will be apparent from the foregoing, upon the acidity of the treating solution, upon the temperature of treatment, and, to some extent, upon the particular nitrosulfonic acid selected. In view of these variables, it is impossible to set numerical time limits, and, at any rate, one becoming familiar with the process described herein will have no difficulty in determining for any set of conditions a suitable length of treating time. By suitable adjustment of the conditions the treating time can be as short as a few seconds. In many cases, however, such short treating times are not necessary or even desirable so that the conditions can be adjusted to operate in a matter of minutes. Preferably conditions are selected to insure completion of the treatment in less than about 20 mintues.

After treating the aluminum surface with the nitrosulfonic acid, the surface is dried, preferably after rinsing with water. The polymeric organic material may then be applied by any conventional means depending upon the exact nature of the polymeric organic material used. The polymeric organic material will generally be of the type that will form a film as is conventional in protective and/or decorative coatings and in adhesives. Such materials include natural and synthetic resins and rubbers, such as phenol-aldehyde resins; urea-aldehyde resins; furfural resins; epoxy resins; polyester resins; silicone resins; polyvinyl resins; like polyvinyl chloride, polyvinyl acetate, copolymers of vinyl chloride and vinyl acetate, polyvinylidene, and polyvinyl butyral; acrylic resins; polyurethane resins and rubbers; polyamide resins; isocyanate polymers and copolymers; polychloroprene; polybutadiene; neoprene; Buna-S; Butyl rubber; and the like. The treatment of the present invention produces the most marked results with compositions comprising natural or synthetic resins, and such materials constitute the preferred organic polymeric materials employed herein. The organic material may be applied as a solution or dispersion in a suitable liquid solvent or diluent, or as a pre-formed film.

Figure 2:
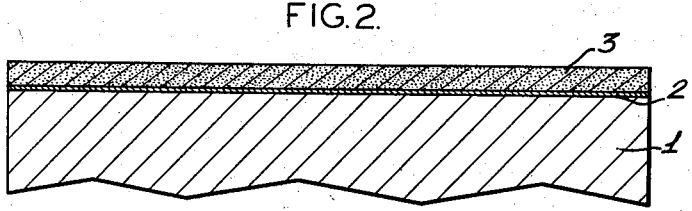
Fig. 2 is a side view in section showing a coating adhered to the aluminum by virtue of the film on the aluminum surface.
Figure 3:
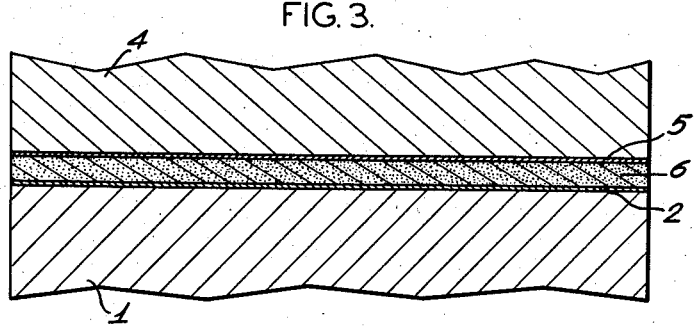
Fig. 3 is a side view in section showing two treated pieces of aluminum bonded to each other by means of an adhesive.

Referring to the drawings, Figure 1 illustrates a magnified cross-section of a body of aluminum 1 the surface of which has been treated in accordance with the present invention to provide a film 2 constituting a reaction product between the aluminum of the aluminum surface and the nitrosulfonic acid. Figure 2 illustrates the product of Figure 1 having thereon a layer 3, of organic polymeric material. Figure 3 illustrates the bonding of the assembly of Figure 1 to another solid body, in this illustration an assembly similar to that of Figure 1 and consisting of aluminum body 4 having thereon film 5. Treated aluminum bodies 1 and 4 are bonded together by means of organic polymeric adhesive 6. Solid bodies which may be adhesively bonded to aluminum as illustrated in Figure 3 may be any solid structural load-carrying material like metals, resins, rubbers, fabrics, wood, leather, glass, ceramics, and the like.

The present invention will be more readily understood from a consideration of the following examples which are given for the purpose of illustration only and are not intended to limit the scope of the invention in any way:

Example I

In this example, 3 grams of paranitrobenzene sulfonic acid are dissolved in 176 ml. of a 50:50 mixture of water and the monoethyl ether of ethylene glycol. The solution has a pH of about 1, and is maintained at 150° F. Two strips of aluminum, 1" x 2⅜" x .064", and two strips of duralumin (4.5% copper, 0.6% manganese, 1.5% magnesium, balance aluminum) of the same dimensions, are degreased in trichloroethylene and wiped with acetone. The strips are immersed in the bath for 15 minutes. The strips are then removed, rinsed with running water at room temperature and dried.

To one broad face of each of the strips is then applied a curing catalyst-containing epoxy resin prepared by mixing 12 parts of diethylenetriamine with 100 parts of epoxy resin. (The coated strips are allowed to stand open for about 75 minutes.) Each set of strips is then brought together with adhesive therebetween to provide a ½" lap joint. About 30 p.s.i. pressure is then applied, and the assemblies are held for about an hour at 300° F. The assemblies are then removed from the oven and press and allowed to cool to room temperature.

The assemblies are then tested for shear strength on a Baldwin tensile tester. The bonded aluminum strips exhibit bond rupture at about 2240 p.s.i., and the bonded duralumin strips exhibit bond rupture at about 1330 p.s.i. Similar, but untreated aluminum and duralumin strips adhered together in the same manner with the same adhesive exhibit bond failure at about 1200 and 960 p.s.i, respectively.

Example II

In this example, 10 grams of 2-nitro-bromobenzene-4-sulfonic acid are dissolved in 175 ml. of water, the bath having a pH of about 1.5. Otherwise following the procedure of Example I, four sets of two strips each of aluminum are immersed in the bath, each set of strips being immersed for a different period of time, namely 5, 10, 15 and 20 minutes, respectively. The results are as follows:

Time of immersion: Bond strength, p.s.i.
5 minutes _____ 1770
10 minutes _____ 2430
15 minutes _____ 2190
20 minutes _____ 1780

*Example III*

In this example, 10 grams of 5-nitro-toluene-2-sulfonic acid are dissolved in 175 ml. of water, the bath having a pH of about 1.5. Otherwise following the procedure of Example I, four sets of two strips each of aluminum are immersed in the bath, each set being immersed for a different period of time, namely, 5, 10, 15 and 20 minutes, respectively. The results are as follows:

Time of immersion: Bond strength, p.s.i.
5 minutes _____ 2230
10 minutes _____ 2340
15 minutes _____ 1690
20 minutes _____ 1890

*Example IV*

A solution is prepared by dissolving 10 grams of 2,4-dinitro-1-naphthol-7-sulfonic acid in 175 ml. of water, the bath having a pH of about 1.5. Otherwise following the procedure of Example I, two strips of aluminum are immersed in the bath for 20 minutes. The resulting bonded strips exhibit bond rupture at about 1410 p.s.i.

*Example V*

A solution is prepared by dissolving 10 grams of m-nitrobenzene sulfonic acid in 170 ml. of water, the bath having a pH of about 1. Otherwise following the procedure of Example I, four sets of two strips each of aluminum are immersed in the bath, each set being immersed for a different time, namely 5, 10, 15 and 20 minutes, respectively. The results are as follows:

Time of treatment: Bond strength, p.s.i.
5 minutes_____ 2550
10 minutes_____ 2450
15 minutes_____ 2030
20 minutes_____ 2110

*Example VI*

A bath is prepared by dissolving 10 grams of 1-nitroanthraquinone-5-sulfonic acid in 165 ml. of water. With the bath at 150° F. and having a pH of about 1, and otherwise following the procedure of Example II using aluminum, the results are as follows:

Time of treatment: Bond strength, p.s.i.
5 minutes_____ 1600
10 minutes_____ 1700
15 minutes_____ 1780
20 minutes_____ 1680

*Example VII*

A bath is prepared by dissolving 5 grams of 2,4-dinitrobenzene sulfonic acid in 165 ml. of water. With the bath at 150° F. and having a pH of about 1 and otherwise following the procedure of Example II, the results are as follows:

Time of treatment: Bond strength, p.s.i.
5 minutes_____ 2390
10 minutes_____ 2140
15 minutes_____ 2170
20 minutes_____ 2220

*Example VIII*

In this example five baths are prepared using 5 grams of the following designated acids in 160 ml. of water: (A) benzene sulfonic acid; (B) p-nitrobenzene sulfonic acid; (C) 2,4-dinitrobenzene sulfonic acid; (D) 5-nitro-1-anthraquinone-5-sulfonic acid, and (E) 5-amino-4-nitro-1-phenol sulfonic acid.

Otherwise following the procedure of Example II and using aluminum strips and immersion times of 10, 15 and 20 minutes, respectively, the results are as follows:

| Immersion Times (min.) | Bond Strengths of Assemblies (p.s.i.) | | | | |
|---|---|---|---|---|---|
| | A | B | C | D | E |
| 10 | 1,540 | 1,730 | 2,330 | 2,330 | 2,070 |
| 15 | 2,160 | 2,300 | 2,520 | 2,430 | 2,660 |
| 20 | 2,140 | 2,750 | 2,730 | 2,330 | 2,550 |

*Example IX*

In this example three baths are prepared by dissolving 3 grams of the following designated acids in a mixture of 88 ml. Cellosolve and 88 ml. of water: (A) benzene sulfonic acids; (B) toluene sulfonic acid, and (C) p-nitro benzene sulfonic acid.

Otherwise following the procedure of Example I with aluminum strips the results are as follows:

Bond strength, p.s.i.
Bath A_____ 1330
Bath B_____ 1180
Bath C_____ 2240

*Example X*

A bath is prepared by dissolving 4.8 grams of 5-nitro-o-toluene sulfonic acid in 160 ml. of water. With the bath (pH about 1) at 150° F. and an immersion time of one minute, but otherwise following the procedure of Example I, the resulting assembly has a bond strength of 1310 p.s.i.

*Example XI*

Example X is repeated, adding, however, 0.16 gram of sodium acid fluoride to the bath. The resulting assembly has a bond strength of 1600 p.s.i.

*Example XII*

In this example four baths are prepared each containing 10 grams of 4-nitrotoluene-2-sulfonic acid per liter of water, the baths differing as follows: (A) 4-nitrotoluene-2-sulfonic acid only; (B) addition of 5 grams per liter of boric acid; (C) addition of 10 ml. of concentrated nitric acid per liter, and (D) addition of 5 grams of boric acid per liter and 10 ml. of concentrated nitric acid per liter.

Using an immersion time of 3 minutes, a bath temperature of 160° F. and an oven cure of 190° C. for 3 hours, but otherwise following the procedure of Example I for aluminum strips, the results are as follows:

Bath: Bond strength, p.s.i.
A_____ 2950
B_____ 2974
C_____ 2826
D_____ 3086

*Example XIII*

A bath is prepared by dissolving 30 grams of 2,4-dinitrobenzene sulfonic acid and 5 grams of boric acid in a liter of water. With the bath at 160° F., an immersion time of 5 minutes, permitting the strips coated with adhesive to stand open for 90 minutes before joining, and a curing cycle of 3 hours at 375° C., but otherwise following the procedure of Example I, the assembly (of aluminum strips) exhibits a bond strength of 3090 p.s.i.

*Example XIV*

A bath is prepared by dissolving 15 grams of the sodium salt of 2,4-dinitrobenzene sulfonic acid, 5 grams of boric acid and 15 ml. of concentrated nitric acid in a liter of water. Following the procedure of Example XIII, the assembly (of aluminum strips) exhibits a bond strength of 3178 p.s.i.

Considerable modification is possible in the selection of the nitrosulfonic acid, and auxiliary agents, if any, and in the amount thereof as well as in the particular technique and procedure employed without departing from the scope of the present invention.

I claim:

1. The method of improving the bondability of an aluminum surface to organic polymeric material which comprises contacting said surface with a solution, at a pH below 4, consisting essentially of a nitrosulfonic acid until said aluminum surface is visibly altered through formation of a film thereon, and recovering the aluminum with said film on the surface thereof.

2. The method of improving the bondability of an aluminum surface toward organic polymeric material which comprises contacting said aluminum surface with a solution, at a pH below 4, consisting essentially of a nitrosulfonic acid and nitric acid, until said aluminum surface is visibly altered through formation of a film thereon and recovering the aluminum with said film on the surface thereof.

3. The method of claim 2 wherein the pH of the solution is between about 0.5 and about 3.

4. The method of improving the bondability of an aluminum surface toward organic polymeric material which comprises contacting said aluminum surface with a solution, at a pH below 4, consisting essentially of a nitrosulfonic acid and boric acid, said solution being substantially free of strong acid other than said nitrosulfonic acid and nitric acid, until said aluminum surface is visibly altered through formation of a film thereon and recovering the aluminum with said film on the surface thereof.

5. The method of improving the bondability of an aluminum surface toward organic polymeric material which comprises contacting said aluminum surface with a solution, at a pH below 4, consisting essentially of a nitrosulfonic acid, boric acid and nitric acid, said solution being substantially free of strong acid other than said nitrosulfonic acid and said nitric acid, until the said aluminum surface is visibly altered through formation of a film thereon, and recovering the aluminum with said film on the surface thereof.

6. A stable composition of matter in solid, finely-divided form, adapted for dissolution in a solvent to provide a bath for treating aluminum surfaces to improve their bondability to organic polymeric materials, consisting essentially of a mixture of a solid, finely-divided nitrosulfonic acid and a solid, finely-divided boric acid compound selected from the group consisting of boric acid and salt thereof.

7. A bath for treating aluminum surfaces to improve their bondability toward organic polymeric material consisting essentially of a solution having a pH below 4, of a nitrosulfonic acid and boric acid, said solution being substantially free of strong acid other than said nitrosulfonic acid and nitric acid.

8. A bath for treating aluminum surfaces to improve their bondability toward organic polymeric material consisting essentially of a solution, having a pH below 4, of a nitrosulfonic acid, boric acid and nitric acid, said solution being substantially free of strong acid other than said nitrosulfonic acid and said nitric acid.

9. The composition of claim 6 wherein the weight ratio of nitrosulfonic acid to boric acid compound is between about 1 to 1 and about 10 to 1.

References Cited in the file of this patent

UNITED STATES PATENTS

| | | |
|---|---|---|
| 1,888,457 | Gann et al. | Nov. 22, 1932 |
| 2,066,842 | Lodeesen | Jan. 5, 1937 |
| 2,172,533 | Freeman | Sept. 12, 1939 |
| 2,637,634 | Howard | May 5, 1953 |
| 2,698,781 | Meyer | Jan. 4, 1955 |